United States Patent
Li et al.

(10) Patent No.: US 8,839,081 B2
(45) Date of Patent: *Sep. 16, 2014

(54) RATE MATCHING AND DE-RATE MATCHING ON DIGITAL SIGNAL PROCESSORS

(75) Inventors: Yuan Li, San Diego (CN); Julien Nicolas, San Diego, CA (US); Jianbin Zhu, Poway (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,034

(22) Filed: Sep. 10, 2012

(65) Prior Publication Data

US 2013/0007382 A1    Jan. 3, 2013

Related U.S. Application Data

(63) Continuation-in-part of application No. 13/100,190, filed on May 3, 2011, now Pat. No. 8,806,310.

(60) Provisional application No. 61/330,710, filed on May 3, 2010.

(51) Int. Cl.
    H03M 13/00    (2006.01)
    H04L 1/00     (2006.01)

(52) U.S. Cl.
    CPC ..................... *H04L 1/0068* (2013.01)
    USPC .......................... 714/790; 714/774

(58) Field of Classification Search
    USPC .......................... 714/763, 774, 790
    See application file for complete search history.

(56) References Cited

U.S. PATENT DOCUMENTS

| | | | | |
|---|---|---|---|---|
| 7,269,783 B2 * | 9/2007 | Barry et al. | ................... | 714/790 |
| 7,280,609 B2 * | 10/2007 | Dottling et al. | ............... | 375/295 |
| 7,451,383 B2 * | 11/2008 | Kim et al. | ..................... | 714/786 |
| 7,764,743 B2 * | 7/2010 | Farag | ............................ | 375/265 |
| 8,510,609 B2 * | 8/2013 | Gil et al. | ........................ | 714/702 |
| 2007/0266302 A1 * | 11/2007 | Barry et al. | ................... | 714/790 |
| 2008/0046800 A1 * | 2/2008 | Pietraski et al. | ............. | 714/790 |
| 2008/0320373 A1 * | 12/2008 | Kim et al. | ..................... | 714/790 |
| 2009/0049360 A1 * | 2/2009 | Shen et al. | .................... | 714/752 |
| 2012/0044883 A1 * | 2/2012 | Jang et al. | ..................... | 370/329 |

OTHER PUBLICATIONS

Xiyuan Chen; Honglin Zhao; Yongkui Ma; Xiangnan Liu;, "A novel puncturing scheme for rate-compatible low-density parity-check codes," Communications and Networking in China (CHINACOM), 2011 6th International ICST Conference on, vol., No., pp. 565-568, Aug. 17-19, 2011.*

(Continued)

*Primary Examiner* — Cynthia Britt

(57) ABSTRACT

Provided are devices, systems and methods for rate matching and de-rate matching on digital signal processors. In one embodiment, a device for rate matching and de-rate matching, includes an interface for receiving a plurality of blocks of data and digital signal processor configured to pre-compute permutation parameters common to the plurality of blocks, wherein the plurality of blocks are subject to a set of given puncturing parameters and receive a set of pre-computed puncturing thresholds. For one or more blocks in the plurality of blocks, the DSP computes a block signature from the pre-computed puncturing thresholds; matches the block signature to one of a set of pre-computed zone signatures, derives a zone index corresponding to the one pre-computed zone signature, and applies pre-computed permutation and puncturing transformations corresponding to the zone index to the block.

18 Claims, 2 Drawing Sheets

(56) References Cited

OTHER PUBLICATIONS

Mizhou Tan; Ibars, C.; Bar-Ness, Y., "Rate-adaptive convolutional coded fixed spreading length (CCFSL) scheme for multi-rate MC-CDMA," Wireless Personal Multimedia Communications, 2002. The 5th International Symposium on , vol. 2, No., pp. 663,667 vol. 2, Oct. 27-30, 2002.*

Jung-Fu Cheng; Nimbalker, A.; Blankenship, Y.; Classon, B.; Blankenship, T.K., "Analysis of Circular Buffer Rate Matching for LTE Turbo Code," Vehicular Technology Conference, 2008. VTC 2008—Fall. IEEE 68th , vol., No., pp. 1,5, Sep. 21-24, 2008.*
Hichan Moon; Cox, D.C., "Performance of unequally punctured convolutional codes," Wireless Communications, IEEE Transactions on , vol. 8, No. 8, pp. 3903,3909, Aug. 2009.*

* cited by examiner

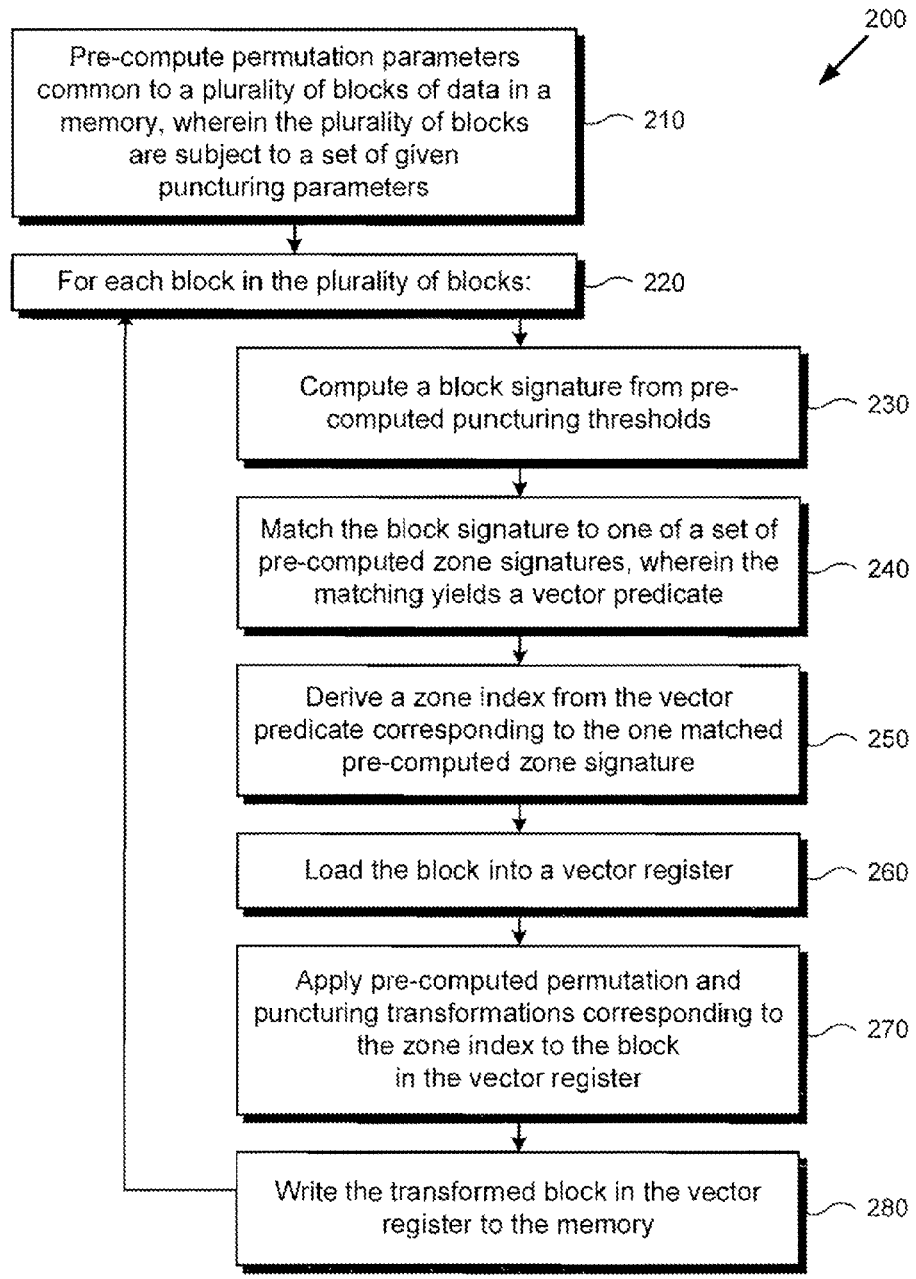

RATE MATCHING AND DE-RATE MATCHING ON DIGITAL SIGNAL PROCESSORS

This application is a continuation-in-part of and claims priority to U.S. patent application Ser. No. 13/100,190, filed May 3, 2011, entitled "Rate Matching and De-Rate Matching on Digital Signal Processors," which in turn claims priority to U.S. Provisional Application No. 61/330,710, filed May 3, 2010, each of which is hereby incorporated by reference in their entirety.

BACKGROUND OF THE INVENTION

1. Field of the Invention

The present invention relates generally to digital signal processing. More particularly, the present invention relates to rate matching and de-rate matching using digital signal processing.

2. Background

Wireless communication systems include a network infrastructure having base stations throughout a coverage area, each of which is dedicated to a cell or cell site. The base stations are controlled by base station controllers that further communicate with a mobile switching center.

The wireless networks operate according to a number of standards including Code Division Multiple Access (CDMA) standards and the Universal Mobile Telecommunications Services (UMTS) including the Wideband CDMA (WCDMA) and Long Term Evolution (LTE) standards. These standards support high throughput for both voice and data.

Networks employ a variety of techniques to guard against signal loss during signal transmission over a data channel. One technique is to use a rate matching algorithm for each block of data that is sent over a channel to ensure that the transmission rate is matched from end to end. Each block of data may be represented by a code word. The code word may be punctured or repeated before being sent over the physical channel.

The rate matching algorithm may only supply a single code word. For Hybrid Automatic Repeat Request (HARD) systems, different versions of the codeword may be provided by the rate matching algorithm, Several techniques are known to perform rate matching. The 3rd Generation Partnership Project (3GPP) has defined several combinations of block size and code rates. Accordingly, defining puncturing or repetitive patterns for each combination is not practical. In addition, a large number of information block sizes and code rate combinations may be found in such as in a communication system.

Further, in communication technologies, such as the High Speed Packet Access (HSPA), which are standardized by 3GPP, when transmitting encoded data, HSPA employs a turbo code having a coding rate of ⅓ to generate 2 parity bits and one systematic per bit of information. Puncturing or repetition of bits may then be performed. A receiver performs error correction decoding on a bit sequence after the rate matching process.

Generally, the above methods are highly inefficient and consume a large amount of processing power. For example, a direct implementation of a puncturing function for rate matching may utilize most, if not all available, processing power of a general computation unit while attempting to perform rate matching or de-rate matching of a bit stream bandwidth.

Accordingly, there is a need to overcome the drawbacks and deficiencies by providing systems and methods for efficient and cost effective rate matching and de-rate matching on digital signal processors.

SUMMARY

The various embodiments provided herein are generally directed to a method, system, and/or device for rate matching and de-rate matching configured for a digital signal processor (DSP) including permutation instructions.

Provided are devices, systems and methods for rate matching and de-rate matching on digital signal processors. In one embodiment, a device for rate matching and de-rate matching, includes an interface for receiving a plurality of blocks of data and digital signal processor configured to pre-compute permutation parameters common to the plurality of blocks, wherein the plurality of blocks are subject to a set of given puncturing parameters and receive a set of pre-computed puncturing thresholds. For one or more blocks in the plurality of blocks, the DSP computes a block signature from the pre-computed puncturing thresholds, matches the block signature to one of a set of pre-computed zone signatures, derives a zone index corresponding to the one pre-computed zone signature, and applies pre-computed permutation and puncturing transformations corresponding to the zone index to the block.

In another embodiment, a system for rate matching and de-rate matching is disclosed including a memory configured to store a plurality of blocks of data. A DSP is configured to pre-compute permutation parameters common to the plurality of blocks. The plurality of blocks are subject to a set of given puncturing parameters and receive a set of pre-computed puncturing thresholds. For one or more blocks in the plurality of blocks, the DSP computes a block signature from the pre-computed puncturing thresholds, match the block signature to one of a set of pre-computed zone signatures, derives a zone index corresponding to the one pre-computed zone signature, and applies pre-computed permutation and puncturing transformations corresponding to the zone index to the block.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 2 presents a flowchart of a method for rate matching and de-rate matching, according to one embodiment of the present invention.

DETAILED DESCRIPTION

Figure 1:
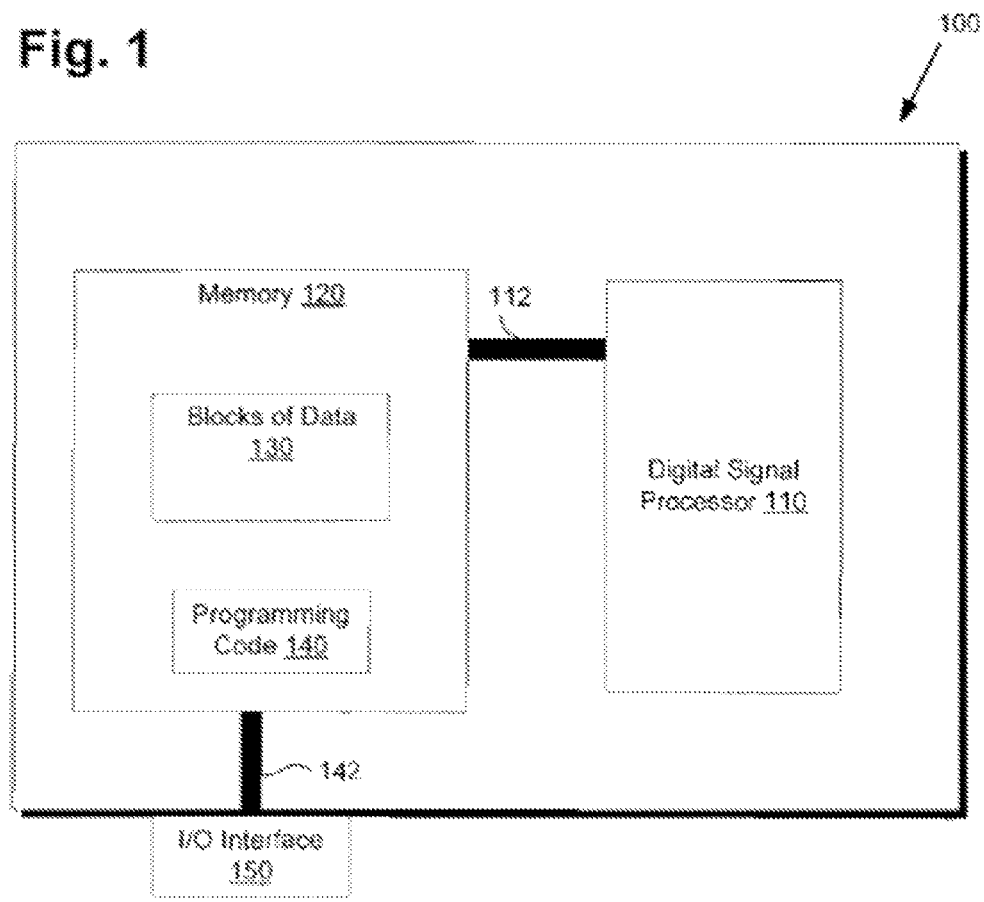
FIG. 1 presents a diagram of a system for rate matching and de-rate matching, according to one embodiment.

Each of the additional features and teachings disclosed below can be utilized separately or in conjunction with other features and teachings to provide a device, system, and/or method for providing rate and de-rate matching configured for a digital signal processor (DSP) including permutation instructions. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure. It is also expressly noted that all value ranges or indications of groups of entities disclose every possible intermediate value or intermediate entity for the purpose of original disclosure.

Devices, methods, and/or systems are described that include a DSP configured for permutation pattern computation. In one embodiment, the permutation pattern for any given output vector of de-rate-matching values may depend on the e parameter of a first element of a vector. In a first method, a permutation pattern for substantially all possible values of the e parameter of the first element of a vector may be pre-computed. Since there are only a limited number of permutation patterns, these may be stored in an array. The DSP may also be configured to depuncture data. The output of a de-rate-matching may be computed block by block, where one or more or each of the blocks may be represented as a vector. For an output vector, the rate-matching parameter e of the first element may be computed and used for selecting a corresponding rate-matching pattern. The number of input elements may also determined by the parameter e. The output vector may be obtained by taking the calculated number of input elements and applying a permutation pattern.

FIG. 1 shows a diagram of a system 100 for rate matching and de-rate matching in one embodiment. The system 100 may include a DSP 110, memory 120, blocks of data 130, programming code 140 and input/output (I/O) interface 150. DSP 110 may comprise any processor, for example, that can be configured to execute programming code and process data in vector form. In one embodiment, DSP may be configured to execute programming code used to transform vector data, according to permutation and puncturing transforms to compare elements of vector data, and to perform iterative mathematical or other processing steps to vector data or elements of vector data. Digital signal processor 110 may also be configured to perform memory operations that affect data within memory 120.

Memory 120 may comprise any device capable of storing blocks of data 130 and/or programming code 140, as shown in FIG. 1. Memory 120 may be configured to allow digital signal processor 110 to access blocks of data 130 and/or programming code 140 using link 112. In addition, memory 120 may be configured to allow other devices to access blocks of data 130 and/or programming code 140 using link 142 and I/O interface 150, in order to allow external devices to provide blocks of data 130 to DSP 110.

Blocks of data 130 may comprise any set of data that may be segmented into blocks for processing by digital signal processor 110. Blocks of data 130 may include one or more or each of the subsets of blocks of data subject to corresponding sets of given puncturing parameters. Blocks of data may also include pre-computed permutation parameters common to one or more or each of the subsets of blocks of data that may be provided by DSP 110 executing programming code 140. Programming code 140 may comprise code executable by DSP 110, and may comprise permutation and puncturing transforms, compare functions, Boolean functions, iterative functions and other executable code to perform the methods described herein.

System 100 depicts DSP 110 separate from memory 120 and I/O interface 150. In other embodiments, memory 120 and/or I/O interface 150 may be integrated with DSP 110. In such embodiments, links 112 and 142 may be omitted or may also be integrated into DSP 110.

The DSP 110 may be configured in a device operable in a wireless communication system. The wireless system may include one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards. The wireless system may include a Public Switched Telephone Network (PSTN) or MSN, GPRS, WCDMA, EDGE nodes and a base station controller as discussed above. The DSP may be configured for use in a private or public network wireless network or for a device that is wired or wireless.

The DSP 110 may be configured for cellular telephones, laptop computers, desktop computers, and data terminals. Some or all of the components of the DSP may be formed on a single Integrated Circuit (IC). For personal digital assistants hosts, laptop hosts, and/or personal computer hosts, the DSP may external to the device.

FIG. 2 shows a flow chart illustrating a method for rate matching or de-rate matching according to an embodiment. Referring to step 210, blocks of data 130 may be subject to a set of given puncturing parameters. One or more or each of the blocks of data in blocks of data 130 may comprise a vector of bits having a particular vector size N, and is subject to a particular set of puncturing parameters, such as e− and e+, which is provided by upper layers in a particular data transmission system. In one method, applying substantially the same set of puncturing parameters to a given set of blocks may be processed using a set of common permutation parameters that may be pre-computed to make rate matching or de-rate matching substantially more efficient.

Permutation parameters that may be pre-computed from a set of puncturing parameters may comprise a vector of puncturing thresholds determining a number of zones corresponding to particular puncturing patterns, a number of input bits for each zone, a permutation transformation for each zone, a puncturing transformation for each zone, and a set of zone signatures comprising a single zone signature for each zone. In one embodiment, a zone index may indicate corresponding permutation parameters, such that a zone signature for a particular zone corresponds to permutation transformation for that zone.

Referring to step 220, an iterative processing step is shown for performing steps 230 through 280 for one or more or each of the blocks in blocks of data 130, as shown in FIG. 1. Although depicted as a compartmentalized set of blocks in FIG. 1, it should be understood that blocks of data 130 may be periodically added to as DSP 110 executes step 220. For example, an external device may periodically add new data to blocks of data 130, such that step 220 continues until such external device stops adding new data to block of data 130.

In step 230, a block signature is computed from pre-computed puncturing thresholds. In one embodiment, a first element of an error vector for a block of data in blocks of data 130 may be used to compute a block signature specific to that block. Such block signature may use substantially the same programming code used to pre-compute a set of zone signatures and may employ the pre-computed puncturing thresholds, such that any computed block signature corresponds to a pre-computed zone signature.

As shown in step 240, matching a block signature to one of a set of pre-computed zone signatures may yield a vector predicate. As noted above, the programming code used to compute the block signature may be substantially the same as that used to pre-compute the zone signatures, such that the block signature matches at least one pre-computed zone signature. A vector predicate may comprise a vector configured to store a matching condition linking the block signature to a particular pre-computed zone signature. In other embodiments, the vector predicate may be omitted and the matching may be used to to derive a zone index directly from the matching.

In step 250, a zone index may be derived from the vector predicate corresponding to the one matched pre-computed zone signature. In other embodiments, a vector predicate may be omitted, and the zone index may be derived directly from the matching to the one matched pre-computed zone signature.

In step 260, a block may be loaded and processed into a vector register. For example, this may be an alternative to copying the data in the block to a new position in memory 120, or referring to the block directly. Step 260 may include sub-steps to pack data corresponding to the block being processed from double words to words, in order to facilitate further processing.

Applying pre-computed permutation and puncturing transformations corresponding to the zone index derived in step 250 to the block in the vector register may be performed at step 270. Such transformations may delete bits from the block being processed, or insert zeros into the block being processed, such that the transformed block comprises a number of bits different from the number of bits of the block before being transformed. By deleting or puncturing bits, or alternatively, de-puncturing bits (e.g., adding zeros), rate matching or de-rate matching on digital signal processor 110 may be performed. The disclosed methods and devices offload substantial processing to a pre-computation step and leverage digital signal processors rather than, for example, additional general computation units.

In step 280, writing the transformed block in the vector register to memory 120 may be performed. In some embodiments, step 280 may include sub-steps to unpack data prior to writing to memory 120. A transformed block may be written back to blocks of data 130 or back to a completely different memory space in memory 120. In some embodiments, the transformation step 270 may be performed directly on a block of data in blocks of data 130, such that no writing to memory 120 need be performed for a block transformed by step 270 to reside in blocks of data 130.

In one embodiment, a de-rate-matching algorithm may be implemented via permutation instructions for a DSP engine. The output of de-rate-matching may be computed vector by vector with vector size of N. For t-th output vector, $$d_t = [d_{t,0} d_{t,1} \ldots d_{t,N-1}]^T \quad (1.1)$$

it is de-punctured from a Q input soft-bits with P zeros inserted, where $$N = P_t + Q_t. \quad (1.2)$$

The first element of error vector $$e_t = [e_{t,0} e_{t,1} \ldots e_{t,N-1}]^T \quad (1.3)$$

can be computed recursively, $$e_{t+1,0} = e_{t,0} - Ne_- + P_t e_+. \quad (1.4)$$

The number of punctured bits, denoted by P, is required to compute Eq. (1.4), and may be computed as:

$$P_t = \left\lceil \frac{Ne_- - e_{t,0}}{e_+} + 1 \right\rceil. \quad (1.5)$$

Noting the entire error range of the first element is $$0 < e_{t,0} \leq e_+. \quad (1.6)$$

For any element $d_{t,j}$, unique integers $e_{t,0} = g_j$ and $k_j$ may be calculated such that $$e_{t,j} = g_j - je_- + k_j e_+ = e_-, \quad (1.7)$$

where $$g_j = ((j+1)e_- - 1) \bmod(e_+) + 1, \quad (1.8)$$

where mod(•) is the modulo function. For any value $0 < e_{t,0} \leq g_j$, bit $d_{t,j}$ is punctured and for any value $g_j < e_{t,0} \leq e_+$, bit $d_{t,j}$ is not punctured. There is a maximum of N distinct values of $g_j$.

For the N elements of the output vector, a corresponding vector may be $$g = [g_0, g_1, \ldots, g_{N-1}]^T \quad (1.9)$$

where $0 < g_j \leq e_+$. If the vector g is sorted into ascending order, the entire range of $e_{t,0}$ is divided into a maximum of N+1 zones by elements of g as follows, $$e_{t,0} \in \begin{cases} (0, g_{v_0}] \\ (g_{v_0}, g_{v_1}] \\ \vdots \\ (g_{v_n}, e_+] \end{cases}. \quad (1.10)$$

Each zone may be characterized by a specific puncturing pattern. Therefore, the maximum number of puncturing patterns may be N+1. In one embodiment, determining the puncturing pattern associated with a specific value of $e_{t,0}$ may be performed by comparing the value $e_{t,0}$ with the thresholds $0 < g_{v_0} < g_{v_1} < \ldots \leq e_+$.

To avoid having to sort the set of values $g_0, g_1, \ldots, g_{N-1}$, a signature that is unique to each zone may be used. The relevant zone for any starting point may then be determined by comparing the signature of the starting point with the signatures of each zone. Without sorting, zone number $n = 0, \ldots, N$ may be represented by the value $g_n \in \{g_0, g_1, \ldots, g_{N-1}, g_N\}$, where $g_N = e_+$.

For each zone $n = 0, 1, \ldots, N$, the number of input bits is a function of the zone number n and is denoted by Q(n).

For each zone $n = 0, 1, \ldots, N$, the permutation vector $r = [r_0, r_1, \ldots, r_{Q-1}]$ is also a function of n, r(n). Both Q(n) and r(n) may be computed using the representing point $e_{t,0} = g_n$ as following.

j=0, —set element index of output vector
i=0, —set element index of input vector $e=g_n$, —set starting error
Do while j<N
  $e=e-e_-$
  If $e \leq 0$ then
    $e=e+e_+$
  Else
    r=j
    i=i+1
  Endif
  j=j+1
end do
Q(n)=i For a given starting point $e_{t,0}$, finding the zone index n may be calculated by comparing a signature vector of $s(e_{t,0})$ A signature vector of each zone may be defined as:
  For each zone number n=0, 1, ..., N,
    Find this zone's typical value $g_n$,
    Compute the signature vector of this zone, $$s(n) = \begin{bmatrix} s_0(n) \\ s_1(n) \\ \vdots \\ s_{N-1}(n) \end{bmatrix} \quad (1.11)$$

$$= sign \begin{bmatrix} g_n - 0e_- + k_0 e_+ \\ g_n - 1e_- + k_1 e_+ \\ \vdots \\ g_n - (N-1)e_- + k_{N-1} e_+ \end{bmatrix}$$

$$= sign \begin{bmatrix} g_n - g_0 + e_- \\ g_n - g_1 + e_- \\ \vdots \\ g_n - g_{N-1} + e_- \end{bmatrix}$$

End for

For a given starting point, a vector of the starting point may be computed as:

$$s(e_{t,0}) = \begin{bmatrix} s_0(e_{t,0}) \\ s_1(e_{t,0}) \\ \vdots \\ s_{N-1}(e_{t,0}) \end{bmatrix} \quad (1.12)$$

$$= sign \begin{bmatrix} e_{t,0} - 0e_- + k_0 e_+ \\ e_{t,0} - 1e_- + k_1 e_+ \\ \vdots \\ e_{t,0} - (N-1)e_- + k_{N-1} e_+ \end{bmatrix}$$

$$= sign \begin{bmatrix} e_{t,0} - g_0 + e_- \\ e_{t,0} - g_1 + e_- \\ \vdots \\ e_{t,0} - g_{N-1} + e_- \end{bmatrix}$$

A zone number n may be found by comparing the signature $s(e_{t,0})$ with each of signature s(0), s(1), ..., s(N-1). In one embodiment, only one signature may match $s(e_{t,0})$. The permutation vector may be selected from the matching index n.

For de-puncturing data, the function generates N soft-bits at a time. The following method may be performed.

Initial $e_{t=0,0}=e_0$ with RM parameter computed.
For each block, $t \in \{0, 1, ...,\}$
  Compute vector $s(e_{t,0})$ using Eq. (1.12).
  Compare $s(e_{t,0})$ with signatures s(0), s(1), ..., s(N-1) and select the unique zone index i with signature matching $s(e_{t,0})$, i.e. $s(i)=s(e_{t,0})$.
  Find pre-computed permutation pattern r(i) and number of input soft-bits Q(i).
  Take a vector of Q(i) soft-bits from input sequence and permute it with permutation pattern r(i), resulting in is a vector with N soft-bits.
  Compute the next starting e value, $e_{t+1,0}$ according to Eq. (1.4).
  Write the output vector sequentially.
Next block.

In other embodiments, the encoders and/or decoders or processing modules may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The encoders and/or decoders or processing modules may be coupled to a memory 240 that is operable to store operational instructions that enable to encoders and/or decoders or processing modules to perform their function.

Such a memory may be a single memory device or a plurality of memory devices. Such a memory may be a read-only memory, random access memory, volatile memory, non-volatile memory, static memory, dynamic memory, flash memory, and/or any device that stores digital information. Note that when the encoders and/or decoders or processing modules implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A system for rate matching and de-rate matching, the system comprising: a memory configured to store a plurality of blocks of data; a digital signal processor (DSP) configured to: pre-compute permutation parameters common to the plurality of blocks, wherein the plurality of blocks are subject to a set of given puncturing parameters; receive a set of pre-computed puncturing thresholds; and for one or more blocks in the plurality of blocks compute a block signature from the pre-computed puncturing thresholds; match the block signature to one of a set of pre-computed zone signatures, derive a zone index corresponding to the one pre-computed zone signature, and apply pre-computed permutation and puncturing transformations corresponding to the zone index to the block.

2. The system of claim 1, wherein the DSP is further configured to load the block into a vector register after deriving the zone index.

3. The system of claim 2 wherein the DSP is further configured to apply the pre-computed permutation and puncturing transformations to the block in the vector register.

4. The system of claim 3, wherein the DSP is further configured to write the block in the vector register to the memory.

5. The system of claim 1, wherein the DSP is further configured to load the block into a vector register after deriving the zone index.

6. The system of claim 5, wherein the DSP is further configured to pack the block in the vector register from double words to words.

7. The system of claim 6; wherein the DSP is further configured to apply the pre-computed permutation and puncturing transformations to the packed block in the vector register.

8. The system of claim 7, wherein the DSP is further configured to unpack the transformed block in the vector register.

9. The system of claim 8, wherein the DSP is further configured to write the unpacked transformed block in the vector register to the memory.

10. A device for rate matching and de-rate matching, comprising: an interface for receiving a plurality of blocks of data; digital signal processor configured to: pre-compute permutation parameters common to the plurality of blocks, wherein the plurality of blocks are subject to a set of given puncturing parameters; receive a set of pre-computed puncturing thresholds; and for one or more blocks in the plurality of blocks compute a block signature from the pre-computed puncturing thresholds; match the block signature to one of a set of pre-computed zone signatures, derive a zone index corresponding to the one pre-computed zone signature, apply pre-computed permutation and puncturing transformations corresponding to the zone index to the block.

11. The device of claim 10, wherein the DSP is further configured to load the block into a vector register after deriving the zone index.

12. The device of claim 11 wherein the DSP is further configured to apply the pre-computed permutation and puncturing transformations to the block in the vector register.

13. The device of claim 12, wherein the DSP is further configured to write the block in the vector register to a memory.

14. The device of claim 10, wherein the DSP is further configured to load the block into a vector register after deriving the zone index.

15. The device of claim 14, wherein the DSP is further configured to pack the block in the vector register from double words to words.

16. The device of claim 15; wherein the DSP is further configured to apply the pre-computed permutation and puncturing transformations to the packed block in the vector register.

17. The device of claim 16, wherein the DSP is further configured to unpack the transformed block in the vector register.

18. The device of claim 17, wherein the DSP is further configured to write the unpacked transformed block in the vector register to a memory.

\* \* \* \* \*